3,535,311
PREPARATION OF ε-CAPROLACTAM
Paul Besson and Albert Nallet, La Chambre, France, assignors to Ugine Kuhlmann, Paris, France, a company of France
No Drawing. Filed Apr. 21, 1967, Ser. No. 632,565
Claims priority, application France, Apr. 25, 1966, 58,846; Feb. 16, 1967, 95,240
Int. Cl. C07d 41/06
U.S. Cl. 260—239.3                              15 Claims

ABSTRACT OF THE DISCLOSURE

ε-Caprolactam is prepared by pyrolyzing a pentamethylene-N-alkylisonitrone such as pentamethylene-N-ethylisonitrone, pentamethylene-N-isopropylisonitrone, pentamethylene-N-t-butylisonitrone, pentamethylene-N-cyclohexylisonitrone or pentamethylene - N - cyanoethylisonitrone, or the corresponding isomeric N-alkylcaprolactam of the isonitrone at a temperature in the range between 400° and 650° C.

BACKGROUND OF THE INVENTION

Certain pentamethylene-N-alkylisonitrones under appropriate conditions isomerize to the corresponding N-alkylcaprolactam. For example, U.S. Pat. No. 2,784,182 discloses that pentamethylene - N - cyclohexylisonitrone transforms to its corresponding isomer N-cyclohexylcaprolactam by heating a solution of the isonitrone in tetraline until the violent conversion reaction starts. N-cyclohexylcaprolactam thus produced is recovered from the reaction product by distillation. The isomerization may be represented by the following equation:

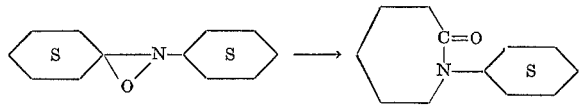

wherein the graphic symbol

represents the saturated hexacyclic aliphatic ring

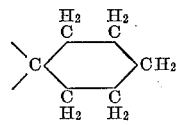

and the graphic symbol

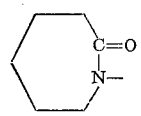

represents the caprolactam ring,

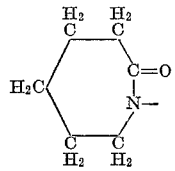

These two symbols will be used hereinafter to represent the respective ring structures. Similarly, William D. Emmons in an article published in Journal of American Chemical Society, vol. 79, pages 5739–53 (1957), entitled "The Preparation and Properties of Oxaziranes" describes an isomerization process in which pentamethylene-N-isobutylisonitrone was converted in a glass tube to N-isobutylcaprolactam at 300° C. according to the following equation:

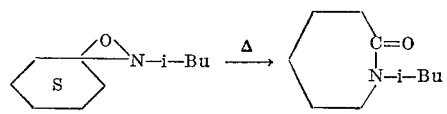

However, the caprolactams which have an alkyl radical attached to the nitrogen atom of the ring, prepared in the manner described have hitherto found little or no commercial application comparable to that of the non-substituted ε-caprolactam. ε-Caprolactam, as is well known, is the starting material for the preparation of polyamide resins which have particular application in the manufacturing of textile fibers.

SUMMARY OF THE INVENTION

We have found that ε-caprolactam can be prepared from pentamethylene-N-alkylisonitrones or the corresponding isomeric N-alkylcaprolactams. Broadly stated, the method of the present invention comprises pyrolyzing at a temperature between 400° C. and 650° C. a pentamethylene-N-alkylisonitrone or a corresponding isomeric N-alkylcaprolactam and recovering thereafter the ε-caprolactam thus produced.

The pentamethylene-N-alkylisonitrone suitable for the invention conforms to one of the following formulas

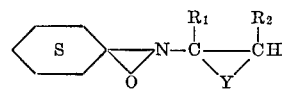

and

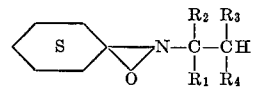

in which $R_1$, $R_2$, $R_3$ and $R_4$ each is (a) hydrogen atom, (b) a monovalent hydrocarbon radical having 1 to 6 carbon atoms, (c) a monovalent functional group of the formula —CN or COOR′ wherein R′ is a hydrogen atom or an alkyl having 1 to 4 carbon atoms, or (d) a substituted monovalent hydrocarbon radical containing at least one of the functional groups identified in (c) and Y is a bivalent hydrocarbon radical or a substituted bivalent hydrocarbon radical containing at least one of the functional groups identified in (c).

The N-alkylcaprolactam suitable for the invention conform to one of the following formulas:

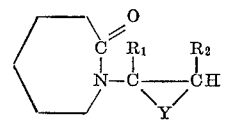

and

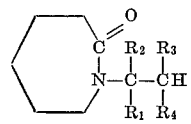

wherein $R_1$, $R_2$, $R_3$, $R_4$ and Y each has the same meaning as stated hereinabove.

DESCRIPTION OF THE PREFERRED EMBODIMENT

According to the method of this invention, the reaction involves the pyrolysis of the pentamethylene-N-alkylisonitrone or the corresponding isomeric N-alkylcaprolactam at high temperature to cleave selectively the C—N bond to produce ε-caprolactam and an ethylenic hydrocarbon. The alkyl group in the isonitrone or the caprolactam may have one or more substituents selected from the group consisting of —CN and —COOR' wherein R' as stated hereinabove can be a hydrogen atom or an alkyl radical of 1 to 4 carbon atoms. Thus the pyrolysis of pentamethylene-N-t-butylisonitrone can be represented by the following equation:

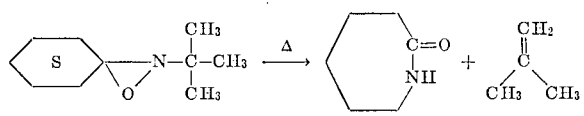

Similarly, the pyrolysis of pentamethylene-N-cyclohexylisonitrone can be represented by the following equation:

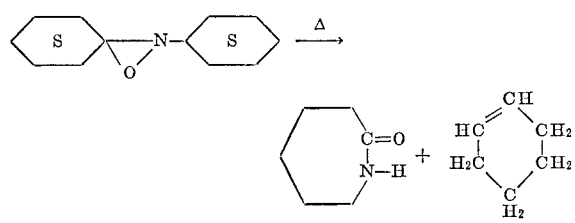

The temperature required for the pyrolysis varies depending on the starting material and is generally within the range of 400° C. to 650° C.

A number of pentamethylene-N-alkylnitrones and the corresponding isomeric N-alkylcaprolactams are suitable as starting materials for preparing ε-caprolactam in accordance with the method of the present invention. Preferably, the alkyl radical attached to the nitrogen atom conforms to one of the two following equations:

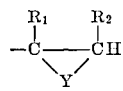

and

wherein $R_1$, $R_2$, $R_3$, $R_4$ and Y each has the same meaning as defined hereinabove. Among the suitable starting materials we found for examples, pentamethylene-N-ethylisonitrone, pentamethylene-N-isopropylisonitrone, pentamethylene - N-t-butylisonitrone, pentamethylene-N-cyclohexylisonitrone, N - cyanoethylcaprolactam, pentamethylene-N-cyanoethylisonitrone, and N-cyclohexylcaprolactam to be eminently suitable.

Using pentamethylene - N - alkylisonitrones as starting materials, isomeric rearrangement may be carried out prior to the cleavage of the C—N bond by pyrolysis. The rearrangement will provide isomers of the formulas depicted as follows:

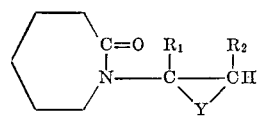

and

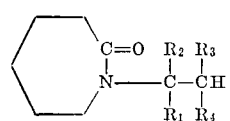

wherein $R_1$, $R_2$, $R_3$, $R_4$ and Y each correspond to the same radicals in the isonitrone.

Further to illustrate this invention, specific examples are described hereinbelow.

EXAMPLE I

A steel pyrolysis tube measured 40 mm. in diameter and 80 centimeters long and filled with 6 mm. steel Raschig rings was used as the reactor for the pyrolysis of pentamethylene-N-ethylisonitrone. The reactor was equipped with an electrical heater capable of providing and maintaining a temperature of 610° C. within the reactor.

282 grams of pentamethylene-N-ethylisonitrone was introduced into the reactor per hour together with 100 liters of nitrogen the latter of which was used as scavenging gas of the tube.

A gaseous mixture was recovered therefrom which comprised the nitrogen, ethylene and ε-caprolactam. The gas was subjected to a condensation reaction and the condensate thus recovered contained ε-caprolactam equivalent to an hourly yield of 165 grams. The yield in ε-caprolactam with respect to the pentamethylene-N-ethylisonitrone employed amounted to 73%.

EXAMPLE II

Pyrolysis of pentamethylene-N-isopropylisonitrone was carried out in the reactor of Example I under the following conditions:

Temperature—580° C.
Hourly input of the isonitrone—310 grams
Hourly input of nitrogen—100 liters A gaseous mixture was recovered therefrom which comprised the nitrogen, propylene, and ε-caprolactam. After condensation, the condensate contained ε-caprolactam equivalent to an hourly yield of 178 grams. The yield in epsilon caprolactam based on the pentamethylene-N-isopropylisonitrone used was 79%.

EXAMPLE III

Pyrolysis of pentamethylene - N-t-butylisonitrone was carried out in the reactor of Example I under the following conditions:

Temperature—570° C.
Hourly input of the isonitrone—338 grams
Hourly input of nitrogen—100 liters A gaseous mixture was recovered which comprised the nitrogen, butylene and ε-caprolactam. The condensate recovered contained ε-caprolactam equivalent to an hourly yield of 154 grams.

The yield in ε-caprolactam based on pentamethylene-N-t-butylisonitrone employed was 68%.

EXAMPLE IV

Pyrolysis of pentamethylene - N-cyclohexylisonitrone was carried out in the reactor of Example I under the following conditions:

Temperature—550° C.
Hourly flow of the isonitrone—390 grams
Hourly flow of nitrogen—100 liters A condensate was recovered which contained cyclohexene and ε-caprolactam equivalent to an hourly yield of 147 grams of the latter product. The yield in ε-caprolactam based on the pentamethylene-N-cyclohexylisonitrone used amounted to 65%.

EXAMPLE V

Pyrolysis of N-cyanoethylcaprolactam was carried out in the reactor of Example I. The temperature of the upper end of the reactor was held at 500° C., 249 grams per hour of the N-cyanoethylcaprolactam and 100 liters of nitrogen were introduced to the reactor, the latter of which was used for scavenging of the reactor.

At the output of the pyrolysis tube 135 grams of ε- caprolactam and 62 grams of acrylonitrile were recovered, both figures being grams per hour.

EXAMPLE VI

There were introduced per hour into the tube of Example I, held at a temperature of 500° C., 250 grams of pentamethylene-N-cyanoethylisonitrone and 100 liters of nitrogen for scavenging the tube. At the output of the tube there were recovered, per hour, 65 grams of ε-caprolactam and 30 grams of acrylonitrile.

EXAMPLE VII

Into the same reactor as that described in Example I and maintained at temperatures of 550° C., there were introduced per hour: 250 grams of N-cyclohexylcaprolactam and 100 liters of nitrogen for scavenging the tube.

There were recovered per hour at the output of the reactor: 12 grams of ε-caprolactam and 8 grams of cyclohexene.

We claim:
1. A method for preparing ε-caprolactam which comprises pyrolyzing at a temperature between 400° C. and 650° C. a pentamethylene-N-alkylisonitrone and recovering thereafter the ε-caprolactam thus produced.

2. A method according to claim 1 wherein the pentamethylene-N-alkylisonitrone has the formula

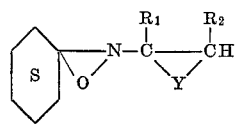

in which $R_1$ and $R_2$ each is (a) hydrogen atom, (b) a monovalent hydrocarbon radical having 1 to 6 carbon atoms, (c) a monovalent functional group of the formula —CN or —COOR$^1$ wherein R$^1$ is a hydrogen atom or an alkyl having 1 to 4 carbon atoms, or (d) a substituted monovalent hydrocarbon radical containing at least one of the functional groups identified in (c), and Y is a bivalent hydrocarbon radical or a substituted bivalent hydrocarbon radical containing at least one of the functional groups identified in (c).

3. A method according to claim 1 wherein the pentamethylene-N-alkylisonitrone has the formula

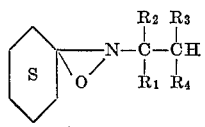

in which $R_1$, $R_2$, $R_3$ and $R_4$ each is (a) hydrogen atom, (b) a monovalent hydrocarbon radical having 1 to 6 carbon atoms, (c) a monovalent functional group of the formula —CN or COOR$^1$ wherein R$^1$ is a hydrogen atom or an alkyl having 1 to 4 carbon atoms, or (d) a substituted monovalent hydrocarbon radical containing at least one of the functional groups identified in (c).

4. A method according to claim 1 wherein the pentamethylene-N-alkylisonitrone is pentamethylene - N-ethylisonitrone.

5. A method according to claim 1 wherein the pentamethylene-N-alkylisonitrone is pentamethylene - N - isopropylisonitrone.

6. A method according to claim 1 wherein the pentamethylene-N-alkylisonitrone is pentamethylene - N - t-butylisonitrone.

7. A method according to claim 1 wherein the pentamethylene-N-alkylisonitrone is pentamethylene - N-cyclohexylisonitrone.

8. A method according to claim 2 wherein the pentamethylene-N-alkylisonitrone forming an intermediate of the formula

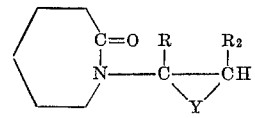

in which $R_1$ and $R_2$ each is (a) hydrogen atom, (b) a monovalent hydrocarbon radical having 1 to 6 carbon atoms, (c) a monovalent functional group of the formula —CN or —COOR$^1$ wherein R$^1$ is a hydrogen atom or an alkyl having 1 to 4 carbon atoms, or (d) a substituted monovalent hydrocarbon radical containing at least one of the functional groups identified in (c), and Y is a bivalent hydrocarbon radical or a substituted bivalent hydrocarbon radical containing at least one of the functional groups identified in (c), prior to the cleavage of the C—N bond during the pyrolysis thus forming the ε-caprolactam.

9. A method according to claim 3 wherein the pentamethylene-N-alkylisonitrone forming an intermediate of the formula

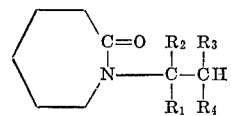

in which $R_1$, $R_2$, $R_3$ and $R_4$ each is (a) hydrogen atom, (b) a monovalent hydrocarbon radical having 1 to 6 carbon atoms, (c) a monovalent functional group of the formula —CN or COOR$^1$ wherein R$^1$ is a hydrogen atom or an alkyl having 1 to 4 carbon atoms, or (d) a substituted monovalent hydrocarbon radical containing at least one of the functional groups identified in (c), prior to the cleavage of the C—N bond during the pyrolysis thus forming the ε-caprolactam.

10. A method for preparing ε-caprolactam which comprises pyrolyzing at a temperature between 400° C. and 650° C. a N-alkylcaprolactam and recovering thereafter the ε-caprolactam thus produced.

11. A method according to claim 10 wherein the N-alkylcaprolactam has the formula

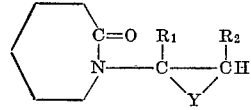

in which $R_1$ and $R_2$ each is (a) hydrogen atom, (b) a monovalent hydrocarbon radical having 1 to 6 carbon atoms, (c) a monovalent functional group of the formula —CN or —COOR$^1$ wherein R$^1$ is a hydrogen atom or an alkyl having 1 to 4 carbon atoms, or (d) a substituted monovalent hydrocarbon radical containing at least one of the functional groups identified in (c), and Y is a bivalent hydrocarbon radical or a substituted bivalent hydrocarbon radical containing at least one of the functional groups identified in (c).

12. A method according to claim 10 wherein the N-alkylcaprolactam has the formula

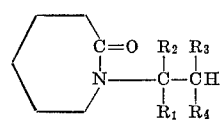

in which $R_1$, $R_2$, $R_3$ and $R_4$ each is (a) hydrogen atom, (b) a monovalent hydrocarbon radical having 1 to 6 carbon atoms, (c) a monovalent functional group of the formula —CN or COOR$^1$ wherein $R^1$ is a hydrogen atom or an alkyl having 1 to 4 carbon atoms, or (d) a substituted monovalent hydrocarbon radical containing at least one of the functional groups identified in (c).

13. A method according to claim 11 wherein the N-alkylcaprolactam is N-cyclohexylcaprolactam.

14. A method according to claim 12 wherein the N-alkylcaprolactam is N-cyanoethylcaprolactam.

15. A method according to claim 1 wherein the pentamethylene-N-alkylisonitrone is pentamethylene-N-cyanoethylisonitrone.

References Cited

UNITED STATES PATENTS 2,784,182   3/1957   Krimm et al. _____ 260—239.3

OTHER REFERENCES

Bailey et al.: I, "J. Org. Chem." vol. 23, pp. 996–1001 (1958).

Bailey et al.: II, "J. Am. Chem. Soc." vol. 81, pp. 651–655 (1959).

Baumgarten et al.: "J. Am. Chem. Soc." vol. 80, pp. 4588–93 (1958).

HENRY R. JILES, Primary Examiner

R. T. BOND, Assistant Examiner